(12) United States Patent
Boek et al.

(10) Patent No.: US 10,918,110 B2
(45) Date of Patent: Feb. 16, 2021

(54) ANTIMICROBIAL PHASE-SEPARATING GLASS AND GLASS CERAMIC ARTICLES AND LAMINATES

(71) Applicant: CORNING INCORPORATED, Corning, NY (US)

(72) Inventors: Heather Debra Boek, Corning, NY (US); John Christopher Mauro, Corning, NY (US); Lisa Anne Moore, Corning, NY (US); Michael S Pambianchi, Corning, NY (US); Natesan Venkataraman, Painted Post, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 57 days.

(21) Appl. No.: 15/202,272

(22) Filed: Jul. 5, 2016

(65) Prior Publication Data

US 2017/0006877 A1  Jan. 12, 2017

Related U.S. Application Data

(60) Provisional application No. 62/189,880, filed on Jul. 8, 2015.

(51) Int. Cl.
*A01N 59/20* (2006.01)
*C03C 10/00* (2006.01)
(Continued)

(52) U.S. Cl.
CPC .............. *A01N 59/20* (2013.01); *B32B 17/06* (2013.01); *C03B 25/00* (2013.01); *C03B 32/00* (2013.01);
(Continued)

(58) Field of Classification Search
CPC ........ A01N 59/20; A01N 25/08; A01N 25/34; B32B 17/06; C03B 25/00; C03B 32/00;
(Continued)

(56) References Cited

U.S. PATENT DOCUMENTS 4,337,295 A * 6/1982 Rittler ..................... C03C 3/089
428/410
7,357,949 B2  4/2008 Trogolo et al.
(Continued)

FOREIGN PATENT DOCUMENTS

CN  1575264 A  2/2005
EP  1136527 A1  9/2001
(Continued)

OTHER PUBLICATIONS

Bobkova et al., "Behavior of Copper Oxide in Silicoborate Glazed Glasses," Glass and Ceramics, vol. 64 No. 7-8, pp. 264-266. (Year: 2007).*

*Primary Examiner* — Josephine L Chang (57) ABSTRACT

A glass laminate for an architectural element has a glass substrate coupled to the architectural element and defines a primary surface facing away from the architectural element. A phase-separable glass cladding is coupled to the primary surface. The cladding has an interconnected matrix with a first phase composition and a second phase that has a second phase composition different than the first phase composition. The second phase is distributed throughout the interconnected matrix. A copper phase is distributed within the interconnected matrix. The glass cladding has an antimicrobial log kill rate greater than about 4 as measured by an EPA Copper Test Protocol.

7 Claims, 8 Drawing Sheets

(51) Int. Cl.
*C03C 14/00* (2006.01)
*C03B 25/00* (2006.01)
*C03B 32/00* (2006.01)
*C03C 17/02* (2006.01)
*B32B 17/06* (2006.01)
*C03C 3/093* (2006.01)

(52) U.S. Cl.
CPC ............ *C03C 3/093* (2013.01); *C03C 14/004* (2013.01); *C03C 17/02* (2013.01); *C03C 2204/02* (2013.01); *C03C 2214/08* (2013.01)

(58) Field of Classification Search
CPC ....... C03C 3/093; C03C 14/004; C03C 17/02; C03C 2204/02; C03C 2214/08; C03C 10/0045
USPC ......................................................... 428/432
See application file for complete search history.

(56) References Cited

U.S. PATENT DOCUMENTS

| | | | |
|---|---|---|---|
| 7,989,674 | B2 | 8/2011 | Flick |
| 8,178,120 | B2 | 5/2012 | Vandesteeg et al. |
| 8,653,156 | B2 | 2/2014 | Ong et al. |
| 8,753,561 | B2 | 6/2014 | Lee et al. |
| 8,801,681 | B2 | 8/2014 | Flick |
| 2003/0118658 | A1 | 6/2003 | Trogolo et al. |
| 2004/0214495 | A1 | 10/2004 | Foss et al. |
| 2005/0106336 | A1 | 5/2005 | Ong et al. |
| 2005/0129742 | A1 | 6/2005 | Bringley et al. |
| 2005/0129766 | A1 | 6/2005 | Bringley et al. |
| 2006/0121078 | A1 | 6/2006 | Trogolo et al. |
| 2006/0142413 | A1* | 6/2006 | Zimmer .................. C03C 3/089 523/122 |
| 2006/0267234 | A1 | 11/2006 | Ong et al. |
| 2006/0270758 | A1 | 11/2006 | Ong et al. |
| 2007/0172661 | A1 | 7/2007 | Fechner et al. |
| 2007/0184238 | A1 | 8/2007 | Hockaday et al. |
| 2009/0314628 | A1 | 12/2009 | Lee et al. |
| 2009/0317435 | A1 | 12/2009 | Vandesteeg et al. |
| 2009/0324738 | A1 | 12/2009 | Krongauz |
| 2010/0101275 | A1* | 4/2010 | Abensour .................. C03C 1/10 65/32.3 |
| 2010/0227052 | A1 | 9/2010 | Carter et al. |
| 2013/0130023 | A1 | 5/2013 | Boulanger et al. |
| 2015/0037553 | A1 | 2/2015 | Mauro |

FOREIGN PATENT DOCUMENTS

| | | |
|---|---|---|
| JP | 5271029 A | 10/1993 |
| JP | 2011241107 A | 12/2011 |
| KR | 2010077133 A | 7/2010 |
| SG | 118828 B | 2/2008 |
| WO | 9602563 | 2/1996 |
| WO | 9935255 | 7/1999 |
| WO | 9935495 | 7/1999 |
| WO | 2004073763 | 9/2004 |
| WO | WO-2012135194 A1 * | 10/2012 ............ C03C 3/089 |

\* cited by examiner

FIG. 4

ANTIMICROBIAL PHASE-SEPARATING GLASS AND GLASS CERAMIC ARTICLES AND LAMINATES

CROSS-REFERENCE TO RELATED APPLICATIONS

This application claims the benefit of priority under 35 U.S.C. § 119 of U.S. Provisional Application Ser. No. 62/189,880 filed on Jul. 8, 2015, the content of which is relied upon and incorporated herein by reference in its entirety.

TECHNICAL FIELD

The present disclosure generally relates to antimicrobial articles. Embodiments described herein relate to copper-containing articles including glass and/or glass-ceramic having improved antimicrobial behavior, as well as to methods of making and using the articles.

BACKGROUND

Architectural elements utilizing glass, such as countertops and display features, have become increasingly more prevalent. Often, surfaces defined by these elements are touched and handled by people and are therefore susceptible to carrying and transmitting disease.

To minimize the presence of microbes on these surfaces, so-called "antimicrobial" properties have been imparted to a variety of glass and glass-ceramic articles. Such articles can exhibit poor antimicrobial efficacy under ordinary use conditions despite performing adequately under generally-accepted or standardized testing conditions and/or can be costly to manufacture (e.g., when expensive metals or alloys are used as the antimicrobial agent or when additional steps are required to introduce the antimicrobial agent into or onto the surface). These deficiencies ultimately can make it impractical to implement the antimicrobial articles.

The biological activity of copper is due in a large part to its ability to exist in what is termed a "free" state as metallic copper or an "ionic" state as a copper salt or oxide. While copper is almost always combined with other elements or minerals, under certain conditions, copper can exist in the ionic or free copper state, both of which are biologically active and thus give copper the ability to kill bacteria, viruses and fungi.

While there has been some discussion in the literature of using elemental copper and copper ions as antimicrobial agents, most of it has been generalized and not applicable to modern product forms. There has not been a description of the specific nature of how particular copper species and forms (e.g., copper nanoparticles) can be employed to obtain and optimize antimicrobial efficacy without detriment to other properties and capabilities of the product.

There accordingly remains a need for technologies that provide copper-containing glass, glass-ceramics or other types of articles with improved antimicrobial efficacy under both ordinary use and generally-accepted testing conditions. It would be particularly advantageous if such technologies did not adversely affect other desirable properties of the articles, such as optical or aesthetic properties. It would also be advantageous if such technologies could be produced in a relatively low-cost manner. It is to the provision of such technologies that the present disclosure is directed.

SUMMARY

According to one aspect of this disclosure, phase-separable glass including an interconnected matrix with a first phase composition and a second phase that has a second phase composition different than the first phase composition. The second phase is distributed throughout the interconnected matrix. A copper phase is distributed within the interconnected matrix. The glass has an antimicrobial log kill rate greater than about 4 as measured by an EPA Copper Test Protocol. In one or more embodiments, the phase separable glass may be utilized in a glass laminate for an architectural element, which may include a glass substrate coupled to the architectural element and defines a primary surface facing away from the architectural element. The phase-separable glass may form a cladding that is coupled to the primary surface.

According to another aspect of this disclosure, a glass article has a bulk concentration of copper between about 1.0 mol. % and about 20.0 mol. %. The glass article also has an interconnected matrix and a second phase distributed throughout the interconnected matrix. The second phase has a copper concentration less than about 0.5 mol. %. A copper phase is distributed within the interconnected matrix. The copper phase comprises a plurality of copper structures that have a largest cross-sectional dimension greater than about 0.1 microns.

According to yet another aspect of this disclosure, a method of creating an antimicrobial glass article that includes the steps of providing a phase-separable glass article with a bulk copper concentration between about 1.0 mol. % and about 20 mol. %, heat treating the article to form an interconnected matrix that has at least one second phase disposed throughout the matrix, and precipitating a copper phase within the matrix and apart from the second phase. The second phase has less than about 1.0 mol. % copper.

Additional features and advantages will be set forth in the detailed description which follows, and, in part, will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

As used herein, the term "antimicrobial" means an agent or material, or a surface containing the agent or material, that will kill or inhibit the growth of microbes from at least two families consisting of bacteria, viruses and fungi. The term as used herein does not mean it will kill or inhibit the growth of all species of microbes within such families, but that it will kill or inhibit the growth of one or more species of microbes from such families. When an agent is described as "antibacterial," "antiviral" or "antifungal," it means that the agent will kill or inhibit the growth of only bacteria, viruses or fungi, respectively.

As used herein, the term "Log Reduction," "log kill" or "LR" means $-\log(C_a/C_0)$, where $C_a$=the colony form unit (CFU) number of the antimicrobial surface containing Cu nanoparticles and $C_0$=the colony form unit (CFU) or the control glass surface that does not contain Cu nanoparticles. That is, $LR=-\log(C_a/C_0)$. As an example, a log kill of 3=99.9% of bacteria or virus killed and a log kill of 5=99.999% of bacteria or virus killed.

Described herein are various antimicrobial articles that have antimicrobial efficacy both under ordinary use conditions and under generally-accepted testing conditions, along with methods for their manufacture and use. The antimicrobial articles also have improved antimicrobial efficacy both under ordinary use conditions and under generally-accepted testing conditions relative to similar or nearly-identical articles.

Figure 1A:
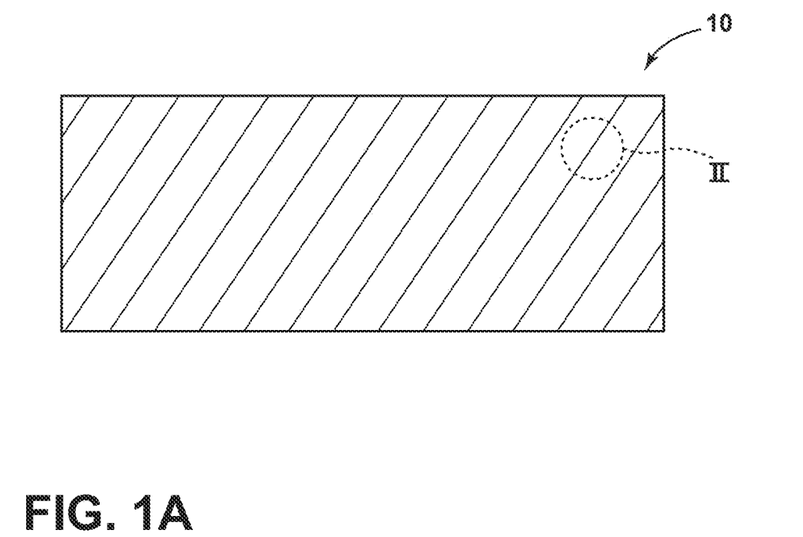
FIG. 1A is a side view of a monolithic antimicrobial article according to one aspect of the disclosure.
Figure 1B:
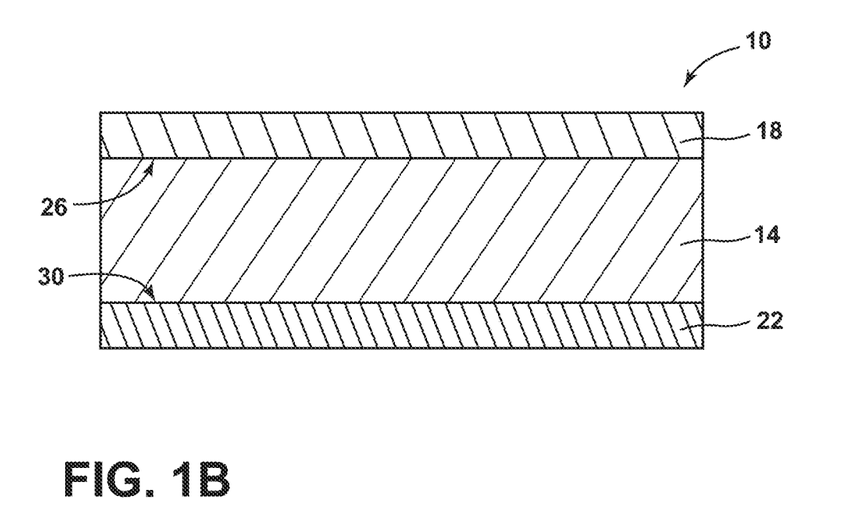
FIG. 1B is a perspective view of a laminate antimicrobial article according to another aspect of the disclosure.
Figure 1C:
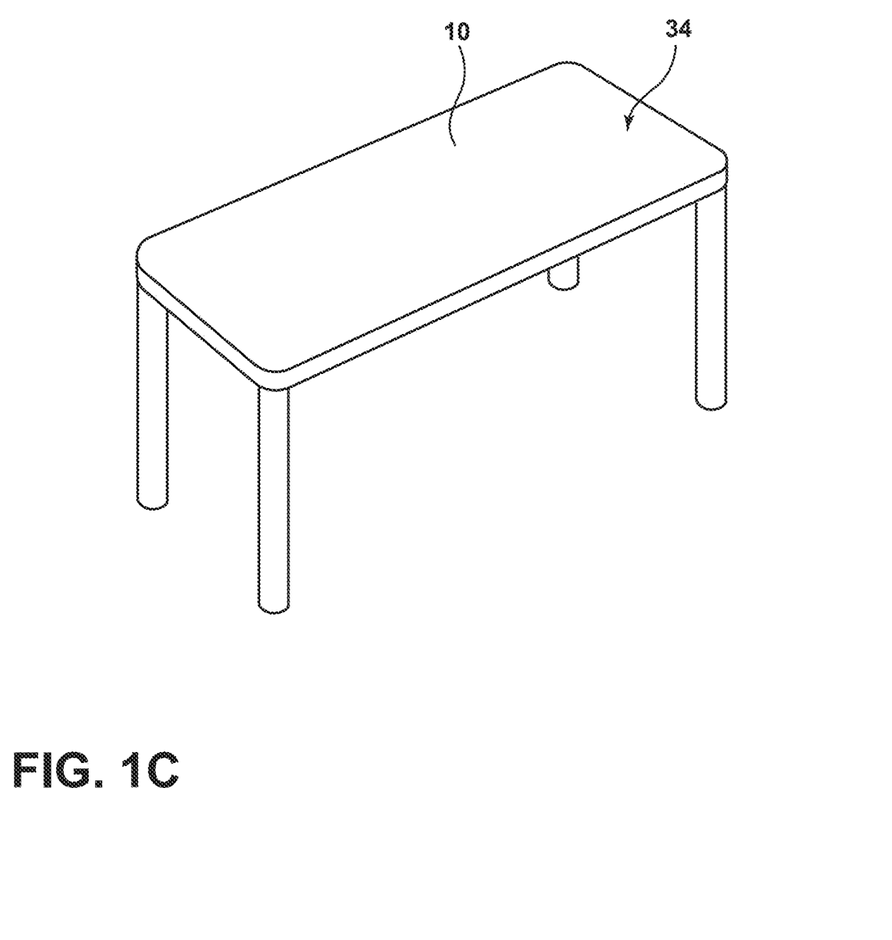
FIG. 1C is a perspective view of an antimicrobial table according to one aspect of the disclosure.
Figure 1D:
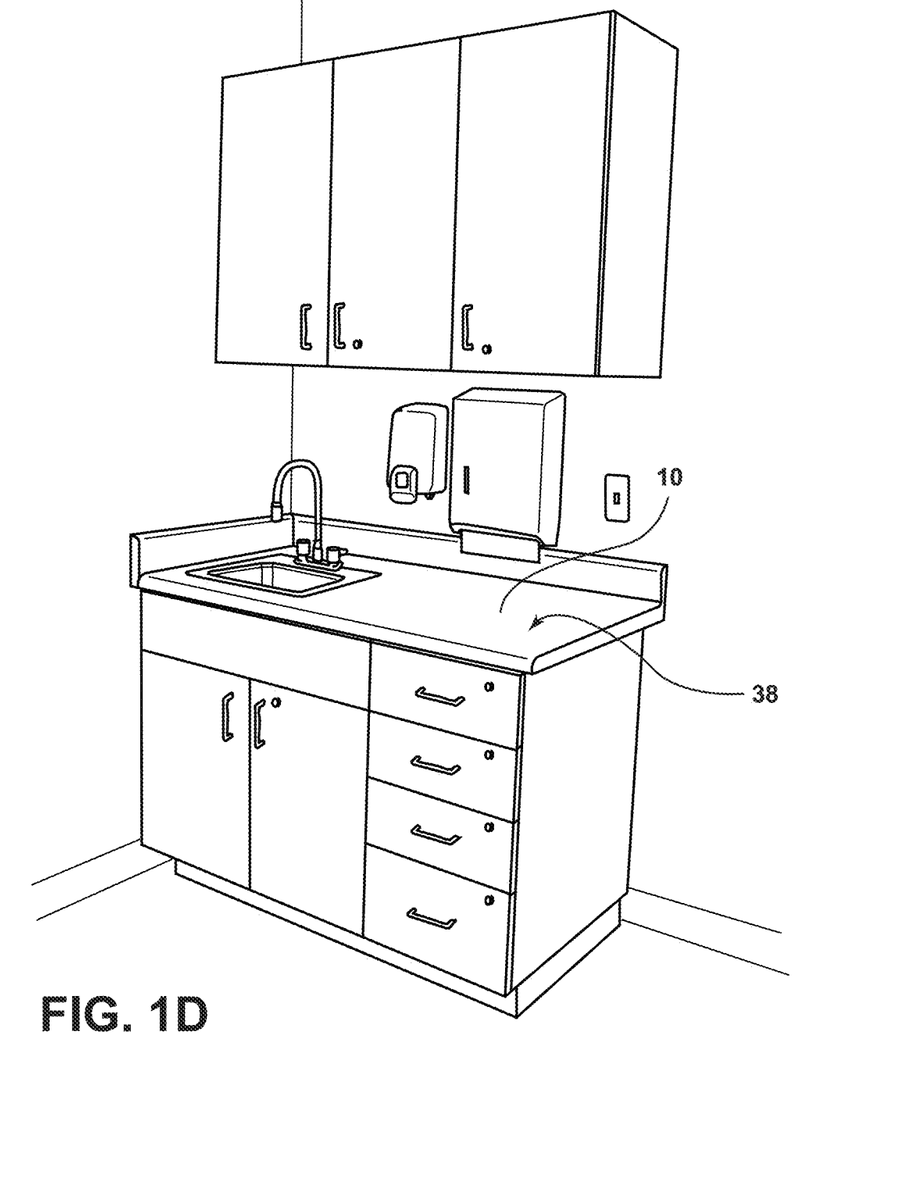
FIG. 1D is a perspective view of an antimicrobial countertop according to another aspect of the disclosure.

Referring now to the depicted embodiments of FIGS. 1A-D, an antimicrobial article 10 is schematically depicted. The antimicrobial article 10 may be a monolithic structure (FIG. 1A) or may at least partially comprise a laminate structure (FIG. 1B). In laminate embodiments, the antimicrobial article 10 may include a substrate 14 and at least one cladding layer. In the depicted embodiment of FIG. 1B, the antimicrobial article 10 includes a first cladding 18 and a second cladding 22. The substrate 14 generally defines a first surface 26 and a second surface 30 which is opposed to the first surface 26. The first and second claddings 18, 22 may be fused, or otherwise bonded, to the first and second surfaces 26, 30 of the substrate 14, respectively. It should be understood that although the antimicrobial article 10 is depicted as having two claddings in FIG. 1B, it may have only a single cladding layer or more than two cladding layers without departing from the spirit of this disclosure.

The antimicrobial article 10 may be useful in a variety of applications where a reduction in microbial growth is desirable. For example, the antimicrobial article 10 may be used as or in an architectural element such as a table top 34 (FIG. 1C), a countertop 38 (FIG. 1D), coasters, desk covers, patio furniture, and the like. Useful settings for the architectural elements may include healthcare settings (e.g., operating rooms, patient examination rooms, corridors), private residences, offices, bathrooms, and high traffic environments. Additional applications of the antimicrobial article 10 include lighting applications, light filtration applications, aesthetic displays designed to be touched, functional hardware (e.g., door handles, dishware), and similar applications. Additionally or alternatively, the antimicrobial article 10 may be utilized for building and automotive glazing. The antimicrobial article 10 may be provided in particulate or fiber form and incorporated into various carriers (e.g., polymers, monomers, binders, solvents, and other materials) to form molded articles, formed articles, coatings on substrates or other such articles.

In laminated embodiments of the antimicrobial article 10, the substrate layer 14 may be formed from a variety of materials including glasses, glass-ceramics, ceramics, polymers and metals. Exemplary glass compositions include those capable of being fused or otherwise bonded (e.g., adhesively, chemically, mechanically) to the first and second cladding layers 18, 22. In some embodiments, the substrate 14 may include alkali metals and/or compounds containing alkali metals while, in other embodiments, the substrate 14 may be substantially free from alkali metals and/or compounds containing alkali metals.

In one particular embodiment, the substrate 14 of the antimicrobial article 10 is formed from a glass composition which comprises from about 60 to about 73 mol. % $SiO_2$; from about 5 to about 16 mol. % $Al_2O_3$; from about 0 to 16 mol. % $B_2O_3$; from about 0 to 16 mol. % $Na_2O$; from about 0 to about 16 mol. % $K_2O$, wherein a total of $Na_2O$ and $K_2O$ is less than or equal to 16 mol. %; from about 0 to about 8 mol. % MgO; from about 0 to about 16 mol. % CaO; from about 0 to about 16 mol. % SrO; from about 0 to about 16 mol. % BaO; from about 0 to about 8 mol. % ZnO, wherein the sum of MgO+CaO+SrO+BaO+ZnO is from about 0 to about 20 mol. %. However, it should be understood that other glass compositions may be used to form the substrate 14 of the antimicrobial article 10, so long as the composition of the substrate 14 is capable of being fused or otherwise bonded to the glass composition of the first and second cladding layers 18, 22.

A variety of processes may be used to form the laminated embodiments of the antimicrobial article 10 described herein including, without limitation, a fusion lamination process, slot-draw lamination processes, and float glass processes. In one particular embodiment, the antimicrobial articles 10 may be formed by a fusion lamination process as described in U.S. Pat. No. 4,214,886, the salient portions of which are incorporated herein by reference. In some embodiments described herein, the glass compositions used for forming the first and second cladding layers 18, 22 have a liquidus viscosity which renders them suitable for use in a fusion draw process and, in particular, for use as a glass cladding composition in a fusion lamination process. For example, in some embodiments, the liquidus viscosity is greater than or equal to about 50 kPoise. In some other embodiments, the liquidus viscosity may be greater than or equal to 100 kPoise or even greater than or equal to 250 kPoise.

Figure 2:
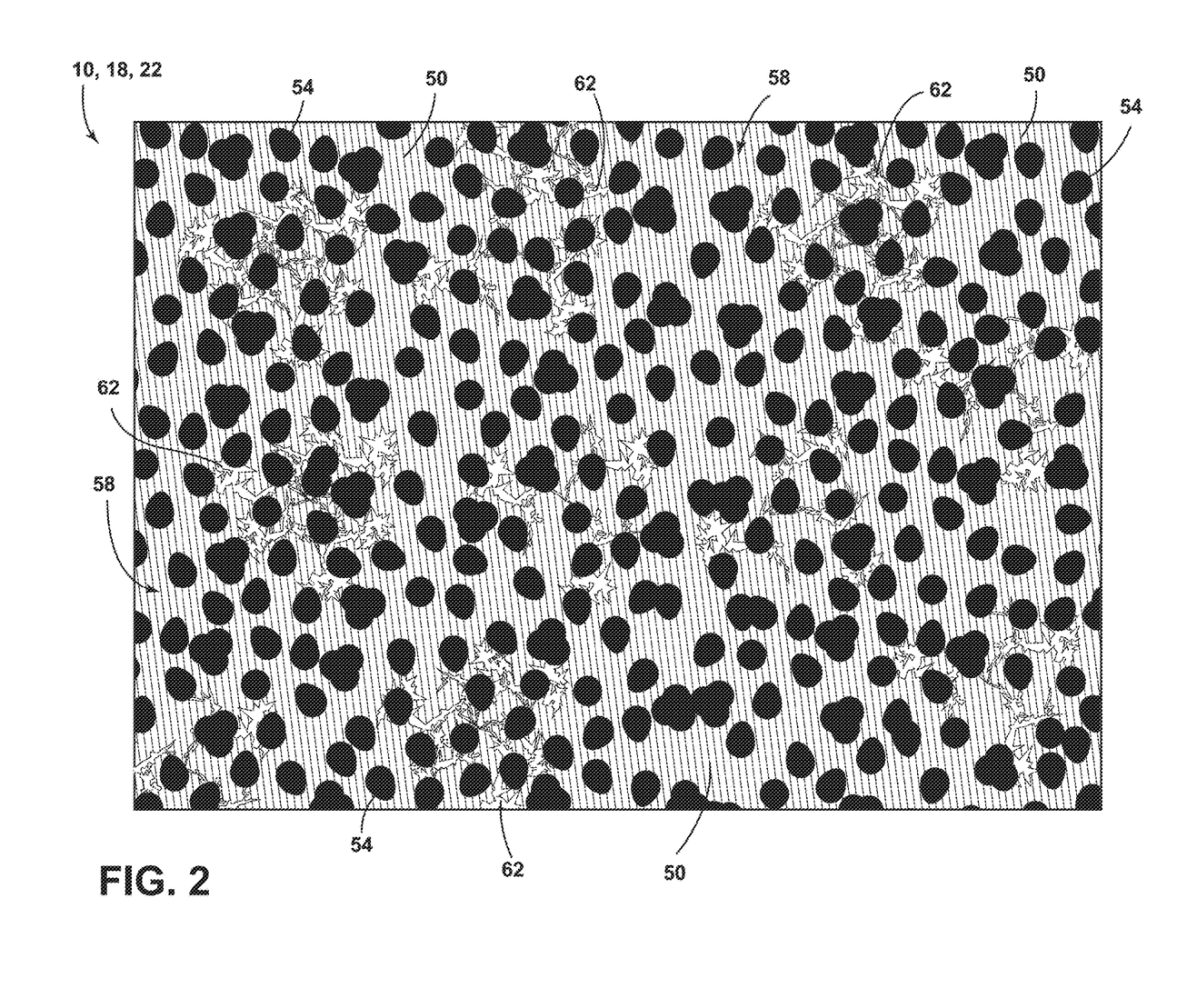
FIG. 2 is a schematic scanning electron microscope (SEM) micrograph in backscatter mode of the article of FIG. 1A taken at II.

Referring now to FIG. 2, the antimicrobial article 10 may include a phase-separating glass. In monolithic embodiments of the antimicrobial article 10 (see FIG. 1A), the entire article 10 may be composed of a phase-separating glass, as depicted in FIG. 2. In embodiments where the antimicrobial article 10 is a laminated structure, the first and/or second cladding 18, 22 may include a phase-separating glass (see FIG. 1B), as also depicted in FIG. 2. As shown in FIG. 2, the phase-separating glass (e.g., with antimicrobial article 10 in FIG. 1A and 18, 22 claddings in FIG. 1B) may include a spinodal phase-separated glass which includes a first glass phase 50 and a second glass phase 54, each of the glass phases 50, 54 have different and distinct compositions, and are separated within the article 10. It should be understood that certain implementations of the antimicrobial articles disclosed herein employ phase-separating glass with more than two phases. Phase-separation may occur upon exposure to a phase-separation treatment, such as a heat treatment or the like. In some embodiments, the phase-separated glass includes an interconnected matrix 58 of glass formed from the first phase 50, with the second phase 54 dispersed throughout the interconnected matrix 58 as discrete, unconnected regions of glass having the composition of the second phase 54. The second phase may itself be interconnected within the interconnected matrix of the first phase, be separate and discrete structures, or include both discrete and continuous structures throughout the antimicrobial article 10 or cladding 18, 22. In various embodiments, the durability, or corrosion resistance of the first phase 50 and the second phase 54 to water, alkaline solutions, and/or acidic solutions may differ. For example, the first phase 50 may more readily dissolve in water and/or acidic solutions than the second phase 54 or vice versa.

In one embodiment, the antimicrobial article 10 and/or the first and second cladding layers 18, 22 may be formed from the glass composition disclosed in U.S. Patent Publication No. 20150037553, having a filing date of Aug. 21, 2014 and entitled "Low CTE Alkali-Free Boroaluminosilcate Glass Compositions and Glass Articles Comprising the Same," the entirety of which is incorporated by reference herein. In this embodiment, the glass composition comprises a combination of $SiO_2$, $Al_2O_3$, $B_2O_3$, and alkaline earth oxides. Such a composition undergoes phase-separation upon heat treatment below the spinodal temperature.

In the foregoing exemplary phase-separating glass composition, $SiO_2$ is the largest constituent and, as such, $SiO_2$ is the primary constituent of the glass network formed from the glass composition. In this embodiment, the glass composition generally includes $SiO_2$ in a concentration less than or equal to about 70 mol. % which may facilitate fusion-forming the glass composition. In some embodiments, the concentration of $SiO_2$ in the glass composition may range between about 50 mol. % and about 70 mol. %. In other embodiments, $SiO_2$ is present in the glass composition in a concentration greater than or equal to about 55 mol. % and less than or equal to about 63 mol. %.

The phase-separating glass composition of this embodiment further includes $Al_2O_3$. The concentration of $Al_2O_3$ in the glass composition is generally less than or equal to about 10 mol. % in order to facilitate formation of laminated embodiments of the antimicrobial article 10 using fusion forming techniques. For example, in some embodiments, the concentration of $Al_2O_3$ in the glass composition is greater than or equal to about 5 mol. % and less than or equal to about 10 mol. %. In some of these embodiments, the concentration of $Al_2O_3$ in the glass composition may be less than or equal to about 9 mol. %, less than or equal to about 8 mol. %, less than or equal to about 7 mol. %, less than or equal to about 6 mol. %, and less than or equal to about 5 mol. %.

The phase-separable glass composition of this embodiment may further include $B_2O_3$. The incorporation of $B_2O_3$ in the glass composition facilitates phase-separating the glass composition into a silica-rich phase and a boron-rich phase. In some embodiments, the silica-rich phase is substantially free of modifiers such as Ca, Sr, Mg and the like (e.g., such modifiers may be present in trace amounts or in amounts of less than about 0.5 mol %, or less than about 0.1 mol %). In some instances, the boron-rich phase may include one or more modifiers such as Ca, Sr, Mg and the like. Where such modifiers are present in the boron-rich phase, they may be present in amounts greater than about 0.5 mol % up to amounts described below with respect to the amount of alkaline earth oxides present in the glass composition). In these embodiments, the silica-rich phase may be more durable or corrosion resistant (i.e., less susceptible to dissolution in water and/or an acidic solution) than the boron-rich phase. $B_2O_3$ is generally present in the glass composition in a concentration greater than or equal to about 14 mol. %. For example, in some embodiments, $B_2O_3$ is present in the glass composition in a concentration greater than or equal to about 14 mol. % and less than or equal to about 25 mol. %. In some of these embodiments, the concentration of $B_2O_3$ in the glass composition may be less than or equal to about 20 mol. %, less than or equal to about 19 mol. %, less than or equal to about 18 mol. %, less than or equal to about 17 mol. %, less than or equal to about 16 mol. %, or less than or equal to about 15 mol. %.

This embodiment of the glass composition used for the antimicrobial article 10 may also include at least one alkaline earth oxide. Alkaline earth oxides generally improve the melting behavior of glass by lowering the temperature required for melting. Moreover, a combination of several different alkaline earth oxides assists in lowering the liquidus temperature of the glass composition and increasing the liquidus viscosity of the glass composition. The alkaline earth oxides included in the glass composition are CaO, MgO, SrO and/or combinations thereof. Alkaline earth oxides may be present in the phase-separable glass in a concentration greater than or equal to about 9 mol. % and less than or equal to about 16 mol. %. In some embodiments, the glass composition may comprise from about 11 mol. % to about 12 mol. % alkaline earth oxide. The glass composition includes at least CaO as an alkaline earth oxide in a concentration greater than or equal to about 3 mol. % and less than or equal to about 12 mol. %. The alkaline earth oxide may further include MgO in a concentration greater than or equal to about 0 mol. % and less than or equal to about 6 mol. %. In some embodiments, the concentration of MgO in the glass composition may be greater than or equal to about 2 mol. % and less than or equal to about 4 mol. %. The alkaline earth oxide in the glass composition may also include SrO in a concentration greater than or equal to about 0 mol. % and less than or equal 6 mol. %. In some embodiments, the SrO may be present in the glass composition in a concentration from about 1 mol. % to about 4 mol. %.

In various embodiments, the antimicrobial article 10 and/or the first and second cladding layers 18, 22 may be substantially free from alkali metals and compounds containing alkali metals. In such embodiments, the articles and/or cladding layers may contain no more than trace amounts of alkali metals and oxides such as $K_2O$, $Na_2O$ and $Li_2O$. However, in some other embodiments, the article 10 and/or first and second cladding layers 18, 22 may be formed from glass compositions which contain alkali ions. In such embodiments, the presence of the alkali ions may facilitate chemically strengthening the glass by ion exchange, thereby improving the strength of the antimicrobial article 10. Additionally or alternatively, the antimicrobial article 10, and the first and second cladding layers 18, 22, may contain no more than trace amounts of phosphorus.

The phase-separable glass may optionally include one or more fining agents. The fining agents may include, for example, $SnO_2$, $As_2O_3$, $Sb_2O_3$ and combinations thereof. The fining agents may be present in the glass composition in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

While reference has been made herein to specific phase-separable glass compositions used for forming the antimicrobial article 10, it should be understood that other glass compositions may be used to form the antimicrobial article 10, so long as the glass compositions are phase-separable.

According to one aspect, the antimicrobial article 10 is heat treated to induce phase-separation in the phase-separable glass, thereby producing the interconnected matrix 58 of the first phase 50 in which the second phase 54 is dispersed. The heat treatment process generally includes heating the antimicrobial article 10 to a temperature proximate the upper consulate temperature or spinodal temperature of the phase-separable glass composition which the antimicrobial article 10 includes and holding the antimicrobial article 10 at this temperature for a time period sufficient to induce the desired amount of phase-separation in the antimicrobial article 10. In some embodiments, the antimicrobial article 10 is heated to a temperature ranging between about 500° C. to about 1500° C., and more particularly to about 800° C. to about 1200° C. In a specific embodiment, the temperature may be about 900° C. The temperature of the heat treatment is selected to heat the antimicrobial article 10 to a range between about 600° C. below the spinodal temperature of the phase-separable glass composition to about 100° C. below the spinodal temperature of the phase-separable glass composition in order to induce phase-separation in the antimicrobial article 10.

The antimicrobial article 10 may be held at the heat treatment temperature for a time period sufficient to impart the desired amount of phase-separation to the antimicrobial article 10. In general, the longer the antimicrobial article 10 is held at the heat treatment temperature, the greater the amount of phase-separation that occurs in the article 10. The antimicrobial article 10 may be held at the heat treatment temperature for a time period between about 1 minute and about 10 hours, and more specifically, between about 30 minutes and about 5 hours. In a specific embodiment, the antimicrobial article 10 is heat treated for about 2 hours. The size and amount of the second phase 54 may be controlled by controlling the time and/or temperature of the heat treatment which, in turn, changes properties of the resultant antimicrobial article 10. For example, by controlling the size, quantity and/or dispersion of the regions of the second phase, properties of the antimicrobial article 10 (e.g., index of refraction, light scattering, modulus of elasticity, and/or loss tangent) may be specifically tailored to meet a desired end use of the article 10.

In some embodiments, the phase-separated glass of the antimicrobial article 10 may have a translucent opalescence or opal-type appearance due to the phase-separation. The opalescence may be desired for applications in which the antimicrobial article 10 is used to enhance the aesthetics of an object. In embodiments where the antimicrobial article 10 includes at least one metallic constituent which has precipitated out, the antimicrobial article 10 may have a color hue similar to that of the metallic phase (e.g., orange/red for copper, yellow for gold, and white/grey for silver/platinum). In embodiments where the antimicrobial article 10 is a laminate structure, the composition of the first and second cladding layers 18, 22 and the substrate 14 may optionally include a colorant to impart color to the antimicrobial article 10. Exemplary colorants include $Fe_2O_3$, $Cr_2O_3$, $Co_3O_4$, CuO, Au, Ag, NiO, $MnO_2$, and $V_2O_5$. In some embodiments, combinations of two or more colorants may be used to achieve a desired color. In other embodiments, colorants may be added to complement a color hue given to the antimicrobial article 10 by one or more metallic constituents within the phase-separating glass as explained in greater detail below. Additionally or alternatively, the colorants may be added to the substrate 14 to cooperate with a colorant or metallic constituent of the first and second claddings 18, 22 to provide a desired color to the antimicrobial article 10.

In embodiments of the antimicrobial article 10 incorporating one or more metallic constituents, heat treatment of the article 10 may result in the precipitation of a metallic phase 62 (see FIG. 2) within at least one of the first and second phases 50, 54, or at interfaces therebetween. The metallic phase 62 may precipitate as at least one discrete structure within the first and second phases 50, 54, or may include continuous or semi-continuous structures. The metallic phase 62 may precipitate in a variety of form factors, including dendrites, cuboid particles, spherical particles, pyramidal particles, and lamellar structures. In some embodiments, the form factor of the metallic phase 62 (e.g., dendrites vs cuboidal structures) may vary with the concentration of the metallic constituents (e.g., copper) in the antimicrobial article 10. The metallic phase 62 may be precipitated into discrete structures having a longest cross sectional length between about 0.01 microns to about 100 microns, about 0.1 microns to about 10 microns, and about 0.5 microns to about 2 microns. In a specific embodiment, the structures of the metallic phase 62 may have a longest cross sectional length of about 1 micron. The metallic phase 62 may be precipitated in a variety of oxidation states, including the "free" state and in ionic states. In embodiments incorporating copper as a metallic constituent, the copper may be precipitated in at least one of a $Cu^0$ and a $Cu^{+1}$ state. As such, treatments configured to reduce the oxidation state of the metallic phase 62, such as hydrogen treatments, may not be necessary during or after precipitation of the metallic phase 62.

Precipitation of certain metallic constituents (e.g., copper, silver, gold, etc.) as the metallic phase 62 in a certain oxidative state (e.g., $Cu^0$ and/or $Cu^{+1}$) within the less corrosion resistant phase (e.g., the first phase 50) may result in an article and/or cladding that exhibits antimicrobial properties toward at least one type of bacteria, virus, or fungi. In a specific example, the precipitation of the metallic phase 62 within the interconnected matrix 58 of the first phase 50 allows the antimicrobial article 10 to exhibit at least a 1 log reduction in a concentration of at least *Staphylococcus aureus, Enterobacter aerogenes*, and *Pseudomonas aeruginosa* bacteria under testing conditions consistent with the *Test Method for Efficacy of Copper Alloy Surfaces as a*

Sanitizer, approved by the U.S. Environmental Protection Agency ("EPA Copper Test Protocol"). The EPA Copper Test Protocol is conducted under ambient conditions (i.e., at <42% relative humidity, ~23° C.). The antimicrobial activity and efficacy of the antimicrobial article 10 described herein can be quite high. In some embodiments, the antimicrobial article 10 may have a log kill rate greater than about 1, greater than about 2, greater than about 3, greater than about 4, greater than about 5, and greater than about 6.

EXAMPLES

Table 1 lists compositions for various experimental samples. FIGS. 3A-3C and 4 are scanning electron microscope micrographs generated during a backscattering mode. For all of the samples (e.g., antimicrobial articles 10) used to generate Table 1 and FIGS. 3A-3C and 4, the samples were melted in 1800 cc covered silica crucibles for approximately 14 hours at 1650° C., drigaged and remelted for approximately 14 hours at 1650° C., then poured. The samples were annealed at 620° C. After the annealing, all samples were heat treated under a nitrogen atmosphere at 875° C. for approximately 2 hours. The sample labeled ADN corresponds to the micrograph of FIG. 3A, the sample labeled ADO corresponds to the micrograph of FIG. 3B, and the sample labeled ADP corresponds to the micrograph of FIG. 3C. In FIG. 4, a bar chart depicts antimicrobial efficacy of the different samples both before and after heat treatment as well as a copper control sample.

TABLE 1

Chemical composition of articles tested for antimicrobial efficacy.

| Melt ID | Mole % | | | | | | | | | | |
|---|---|---|---|---|---|---|---|---|---|---|---|
| | $SiO_2$ | $Al_2O_3$ | $B_2O_3$ | MgO | CaO | SrO | $Na_2O$ | $SnO_2$ | $ZrO_2$ | $P_2O_5$ | CuO |
| ADN | 57.51 | 5.62 | 18.28 | 0.43 | 4.57 | 0.44 | 0.01 | 0.06 | 0.04 | 0 | 13.04 |
| ADO | 55.11 | 5.38 | 17.51 | 0.42 | 4.38 | 0.42 | 0.01 | 0.06 | 0.04 | 0 | 16.67 |
| ADP | 52.9 | 5.17 | 16.82 | 0.4 | 4.2 | 0.4 | 0.01 | 0.06 | 0.04 | 0 | 19.99 |

Figure 3A:
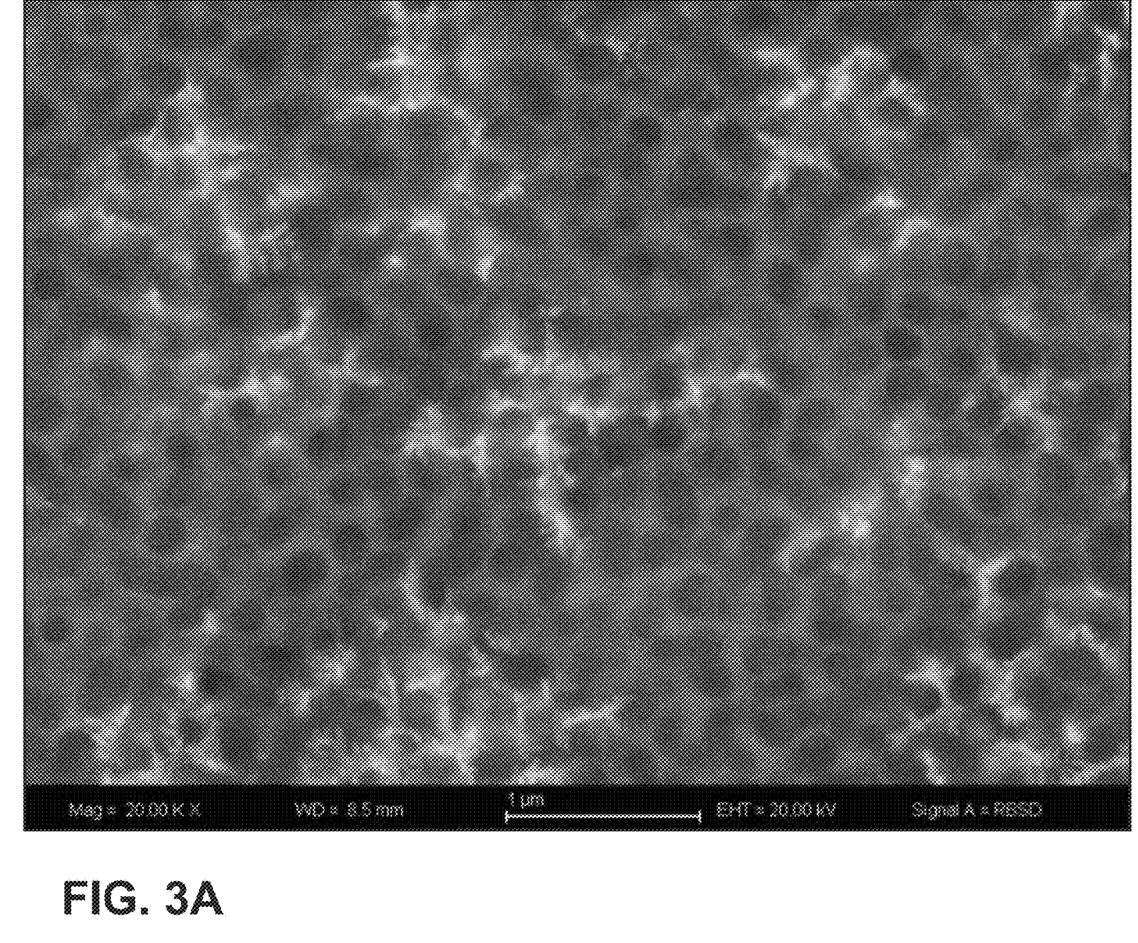
FIG. 3A is an SEM micrograph of the glass article according to one embodiment.
Figure 3B:
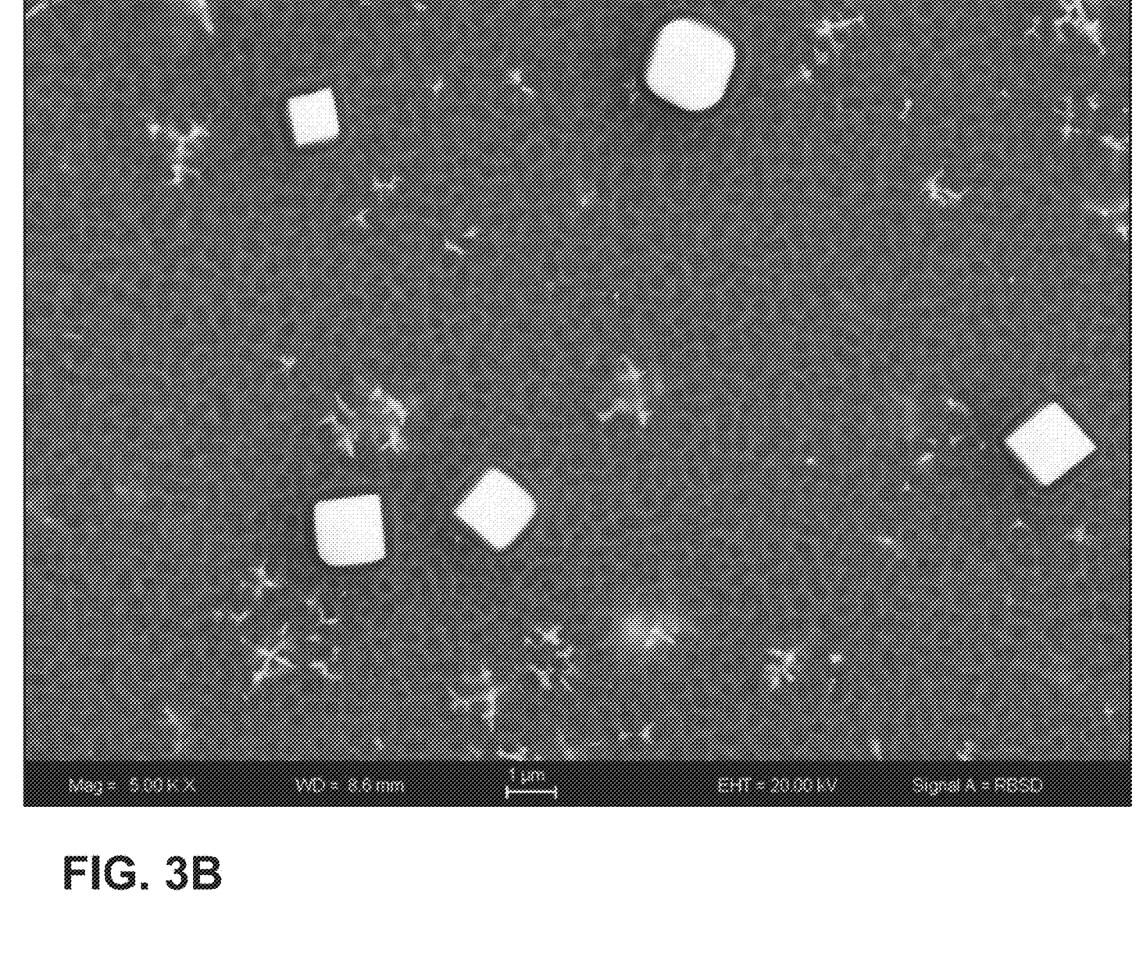
FIG. 3B is an SEM micrograph of the glass article according to another embodiment.
Figure 3C:
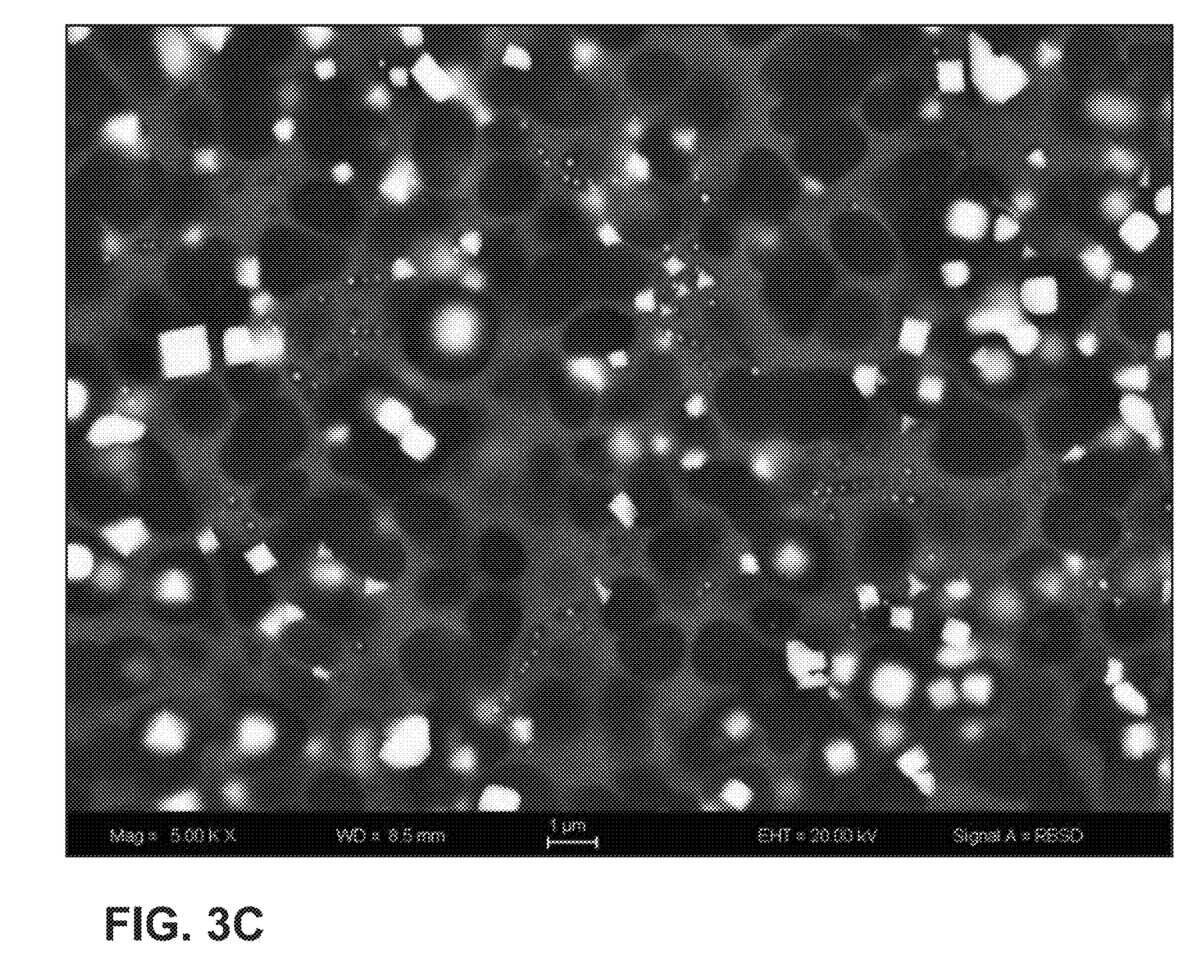
FIG. 3C is an SEM micrograph of the glass article according to yet another embodiment.
Figure 4:
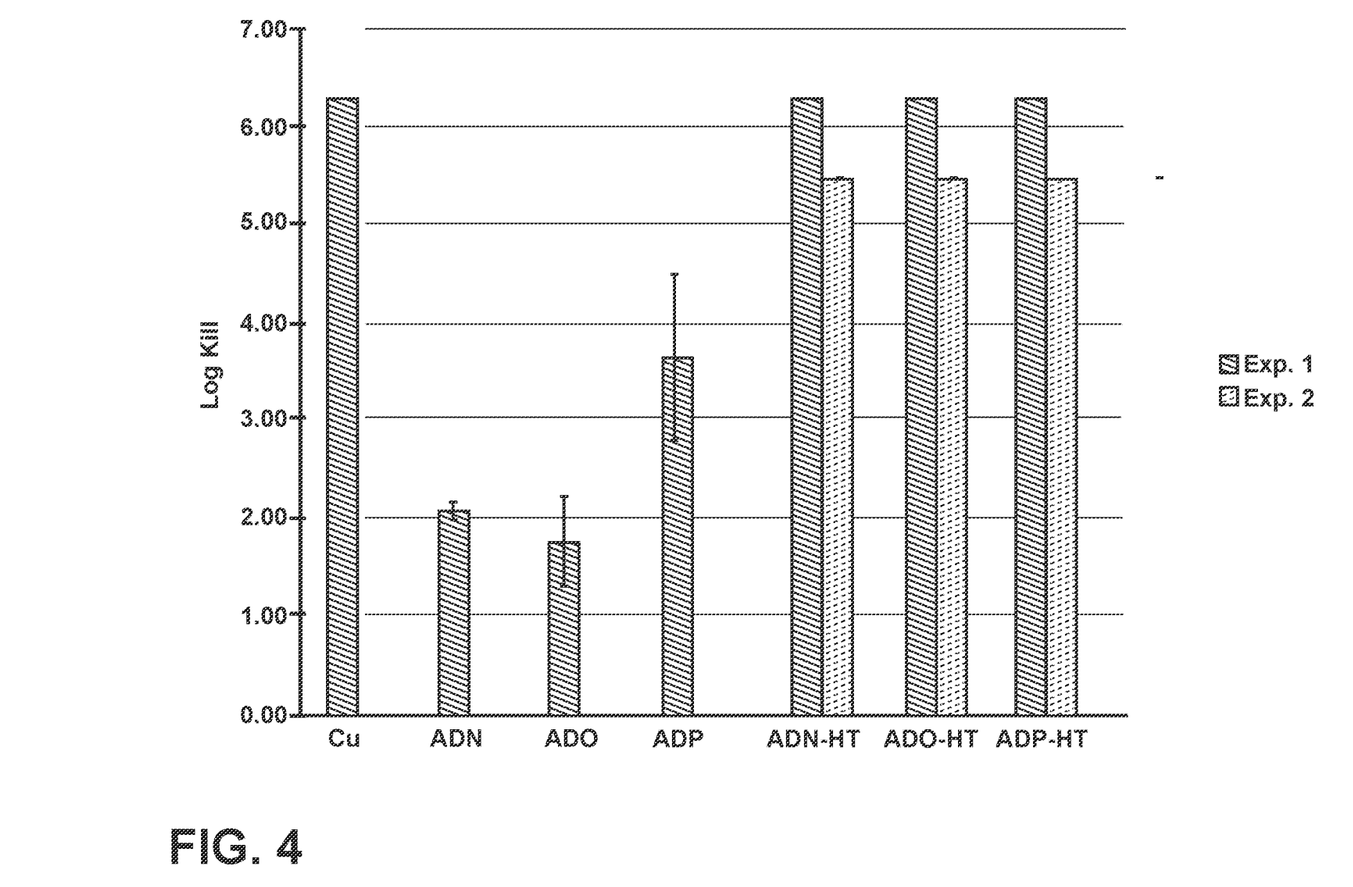
FIG. 4 is a bar chart depicting antimicrobial efficacy of the antimicrobial structures depicted in FIGS. 3A-C under the EPA Copper Test Protocol according to an aspect of the disclosure.

Referring to Table 1 and FIGS. 3A-3C, the samples ADN, ADO, and ADP generally have an increasing copper concentration. As the copper concentration in the sample increases, metallic copper (e.g., metallic phase 62) precipitated in the samples during the heat treatment changes from a dendritic form (see FIG. 3A) to a cuboid form (See FIG. 3C). Additionally, the metallic copper (e.g., metallic phase 62) transitions from precipitating out only in a boron rich (i.e., less durable or less corrosion resistant) phase (e.g., the first phase 50) forming an interconnected structure (e.g., interconnected matrix 58) and begins precipitating in both the boron rich phase and a silicon rich phase (e.g., the second phase 54) with increasing copper concentration.

Referring now to FIG. 4, results of an antimicrobial test on the samples (e.g., embodiments of antimicrobial article 10) as described in connection with the embodiments of Table 1 under the EPA Copper Test Protocol are depicted. For each of samples ADN, ADO, and ADP, two separate experimental samples were formed, annealed, and heat treated in accordance with the procedure described herein and then tested for antimicrobial efficacy. The results of antimicrobial efficacy testing after heat treatment of the first of the two experimental samples for are represented by Experiment 1 for ADN-HT, ADO-HT, and ADP-HT in FIG. 4, and the results of antimicrobial efficacy testing after heat treatment of the second of the two experimental samples for each of samples ADN, ADO, and ADP are represented by Experiment 2 for ADN-HT, ADO-HT, and ADP-HT in FIG. 4. In particular, the EPA antimicrobial efficacy testing was conducted at 23° C. and 42% relative humidity. Notably, samples ADN and ADP demonstrated a log kill value of at least 2 (e.g., a 99.00% kill rate) in the pre-heat treat state and all the samples demonstrated a log kill value greater than 5 (e.g., 99.999%) after the heat treatment. As a control, log kill data is provided for pure Cu metal samples tested under the same conditions. Consequently, it is evident that antimicrobial articles 10 having precipitated copper phases prepared according to the disclosure may have antimicrobial efficacy. It should be noted that unlike conventional disclosures of copper incorporated into glass substrates, the samples of Table 1 were not reduced (e.g., in a hydrogen atmosphere) to become antimicrobial. However, using a phase-separated glass allows the precipitated copper phase to have an as precipitated oxidation state of at least one of $Cu^0$ and $Cu^{+1}$.

Additionally, it appears from the samples that an increase in antimicrobial efficacy is not gained from an increase in the concentration of copper within the samples. As such, it may be advantageous, in some embodiments, to limit the copper concentration to about that of the ADN sample such that peak antimicrobial efficacy is gained using the minimum amount of copper. The precipitation of the copper phase, as copper concentration increases, takes place within the less durable phase, or less corrosion resistant phase, first. It is believed that for metallic copper to impart antimicrobial properties to a phase-separable glass the metallic copper must be precipitated within the less durable phase and not the more durable phase (i.e., silicon rich, more corrosion resistant phase). Thus, by utilizing lower copper concentrations (e.g., comparable to that of the ADN sample, about 8 mol. % to about 12 mol. %) the copper can be precipitated (e.g., metallic phase 62) in only the less durable phase (e.g., first phase 50) thereby both using less copper and precipitating it in a phase that will impart antimicrobial efficacy to antimicrobial article 10.

While the embodiments disclosed herein have been set forth for the purpose of illustration, the foregoing description should not be deemed to be a limitation on the scope of the disclosure or the appended claims. For example, antimicrobial elements may be incorporated into the antimicrobial article 10 to impart antimicrobial properties and the article 10 may be used for medical equipment. Accordingly, various modifications, adaptations, and alternatives may occur to one skilled in the art without departing from the spirit and scope of the present disclosure or the appended claims.

What is claimed is:

1. A glass article, comprising:
   $SiO_2$;
   a bulk concentration of copper between about 13.0 mol. % and about 20.0 mol. %;

an interconnected matrix;

a second phase distributed throughout the interconnected matrix having a copper concentration less than about 0.5 mol. %; and a copper phase distributed within the interconnected matrix, wherein the copper phase comprises a plurality of copper structures having a largest cross-sectional dimension between about 0.1 microns and about 10 microns.

2. The glass article of claim 1, wherein the interconnected matrix is less corrosion resistant to at least one of water and an acid than the second phase.

3. The glass article of claim 1, wherein the article has an antimicrobial log kill rate greater than about 5 as measured by the EPA Copper Test Protocol.

4. The glass article of claim 1, wherein the copper structures are in at least one of a $Cu^0$ or a $Cu^{+1}$ state.

5. The glass article of claim 1, wherein the second phase contains no more than 0.1 mol. % of the copper phase.

6. The glass article of claim 1 further comprising:
a bulk concentration of $SiO_2$ of 50 mol. % to 70 mol. %.

7. The glass article of claim 6, further comprising:
a bulk concentration of $B_2O_3$ of 14 mol. % to 25 mol. %.

\* \* \* \* \*